US008935044B2

(12) United States Patent
Yang et al.

(10) Patent No.: US 8,935,044 B2
(45) Date of Patent: Jan. 13, 2015

(54) REFUELING DETECTION FOR DIAGNOSTIC MONITOR

(71) Applicant: Ford Global Technologies, LLC, Dearborn, MI (US)

(72) Inventors: Dennis Seung-Man Yang, Canton, MI (US); Mark Daniel Bunge, Dearborn, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/875,201

(22) Filed: May 1, 2013

(65) Prior Publication Data

US 2014/0330482 A1 Nov. 6, 2014

(51) Int. Cl.

| | |
|---|---|
| ***G06F 11/30*** | (2006.01) |
| ***G07C 5/00*** | (2006.01) |
| ***F02M 25/08*** | (2006.01) |
| *F02D 41/04* | (2006.01) |

(52) U.S. Cl.

CPC ................. *G07C 5/00* (2013.01); *F02M 25/08* (2013.01); *F02D 41/042* (2013.01)

USPC ..... 701/34.4; 701/29.2; 701/31.1; 73/114.45; 73/114.39; 123/518; 123/519; 340/438

(58) Field of Classification Search

CPC .. F02M 25/08; F02D 41/062; F02D 41/1497; F02D 41/221

USPC .................... 701/29.2, 31.1, 31.9, 33.9, 34.4; 73/114.45, 114.39, 49.7; 123/518, 519, 123/520; 340/438, 425.5

See application file for complete search history.

(56) References Cited

U.S. PATENT DOCUMENTS

| | | | | |
|---|---|---|---|---|
| 4,962,744 | A | 10/1990 | Uranishi et al. | |
| 5,353,757 | A * | 10/1994 | Susa et al. | 123/41.29 |
| 6,227,037 | B1 * | 5/2001 | Kawamura et al. | 73/49.7 |
| 6,964,193 | B2 | 11/2005 | Kobayashi et al. | |
| 7,004,013 | B2 | 2/2006 | Kobayashi et al. | |
| 7,233,845 | B2 | 6/2007 | Veinotte | |
| 7,472,583 | B2 | 1/2009 | Kato et al. | |

(Continued)

FOREIGN PATENT DOCUMENTS

| | | | |
|---|---|---|---|
| DE | 102011116320 | A1 | 4/2012 |
| JP | H07317612 | A | 12/1995 |

OTHER PUBLICATIONS

Jentz, Robert Roy et al., "Engine-Off Refueling Detection Method," U.S. Appl. No. 13/788,624, filed Mar. 7, 2013, 32 pages.

(Continued)

*Primary Examiner* — Gertrude Arthur Jeanglaude

(74) *Attorney, Agent, or Firm* — James Dottavio; Alleman Hall McCoy Russell & Tuttle LLP

(57) ABSTRACT

Methods and systems for detecting a refueling event for diagnostics are disclosed. In one example approach a method comprises discontinuing leak diagnostics in response to a temperature change in a fuel vapor canister coupled to a fuel tank in an emission control system while the leak diagnostics are being performed in the emission control system.

20 Claims, 4 Drawing Sheets

(56) References Cited

U.S. PATENT DOCUMENTS

| | | | | |
|---|---|---|---|---|
| 8,245,699 | B2 | 8/2012 | Peters et al. | |
| 8,342,157 | B2 | 1/2013 | Der Manuelian et al. | |
| 2005/0044935 | A1 | 3/2005 | Barrera et al. | |
| 2008/0302176 | A1 * | 12/2008 | Friedl et al. | 73/114.45 |
| 2010/0126477 | A1 * | 5/2010 | Reddy | 123/520 |
| 2011/0265768 | A1 | 11/2011 | Kerns et al. | |
| 2012/0211087 | A1 | 8/2012 | Dudar et al. | |
| 2012/0215399 | A1 | 8/2012 | Jentz et al. | |

OTHER PUBLICATIONS

Dudar, Aed M. et al., "Fuel Tank Depressurization Before Refueling a Plug-In Hybrid Vehicle," U.S. Appl. No. 13/906,187, filed May 30, 2013, 28 pages.

Lindlbauer, Michael Paul et al., "Fuel Tank Isolation Valve Control," U.S. Appl. No. 13/948,668, filed Jul. 23, 2013, 31 pages.

Dudar, Aed M. et al., "Internal Orifice Characterization in Leak Module," U.S. Appl. No. 13/891,054, filed May 9, 2013, 37 pages.

* cited by examiner

REFUELING DETECTION FOR DIAGNOSTIC MONITOR

BACKGROUND/SUMMARY

To reduce discharge of fuel vapors into the atmosphere, motor vehicles induct fuel vapors from a fuel tank into the engine. An evaporative emission control system including a carbon canister is also coupled to the fuel tank to adsorb fuel vapors under some conditions when the internal combustion engine is not running. The carbon canister, however, has limited capacity, thus engine running manifold vacuum may be used to desorb the vapor from the carbon canister via opening of a purge valve. Desorbed vapors are combusted in engine.

Diagnostics may be performed on the evaporative emission control system, e.g., to detect leaks in the system. For example, diagnostics may be performed to test for leaks in the emission control system during engine off conditions, e.g., after a vehicle key off, to mitigate noise factors associated with vehicle dynamics such as road feedback, sharp-turn G forces, fuel sloshing, etc. During leak detection execution, a controller may operate in a low power mode with some sensors in the system depowered, e.g., a fuel level sensor may be turned off during leak detection.

The inventors herein recognize that a refueling event is a major noise factor that can skew leak detection results as it introduces vapors into the tank. For example, with natural vacuum leak detection, a refueling event can result in a false pass if not detected properly. As another example, with vacuum-pump based leak detection, a refueling event can result in a false fail if not detected. Thus, it is desirable for a controller to detect a refueling event and abort any leak detection algorithm execution in response to detection of the refueling event. In some approaches, a fuel tank pressure sensor may be used to infer a refueling event. However, such approaches are prone to false refueling determinations during certain conditions, e.g., if the vehicle is being towed, a trunk is opened and slammed shut, someone sits on the car and shakes it, etc.

In one example approach to at least partially address these issues, a method for a vehicle with an engine comprises discontinuing leak diagnostics in response to a temperature change in a fuel vapor canister coupled to a fuel tank in an emission control system while the leak diagnostics are being performed in the emission control system. For example, during refueling, vapors dispensed by a refueling pump may be adsorbed in the canister leading to a temperature rise in the canister. This change in temperature may be used as an indication that refueling is occurring or has occurred for the particular engine off condition during which the diagnostics are being performed by a controller in the vehicle. Such identification may occur in the absence of a fuel tank pressure sensor, independent of a fuel tank pressure sensor, or in response to degradation of a fuel tank pressure sensor. In another aspect, the identification may also occur in response to both a pressure sensor and detection of a predetermined temperature change in the canister.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
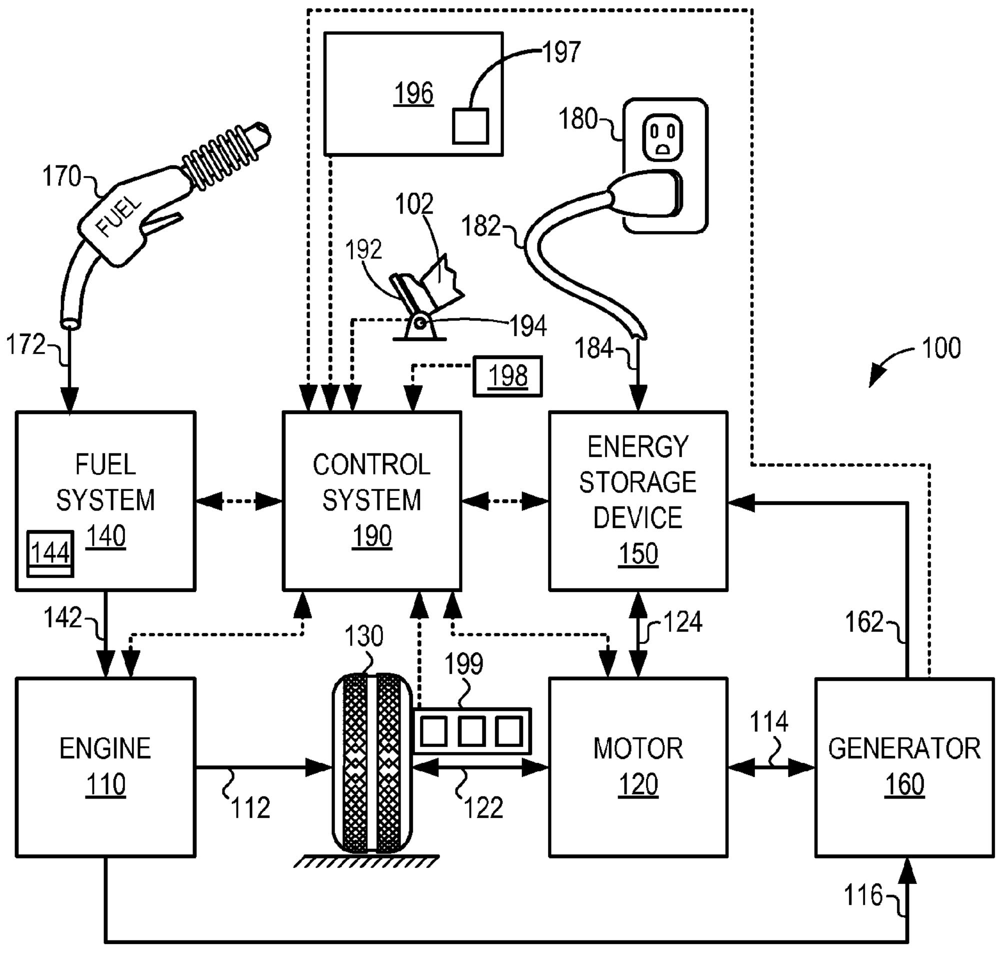
FIG. 1 shows an example vehicle propulsion system.
Figure 2:
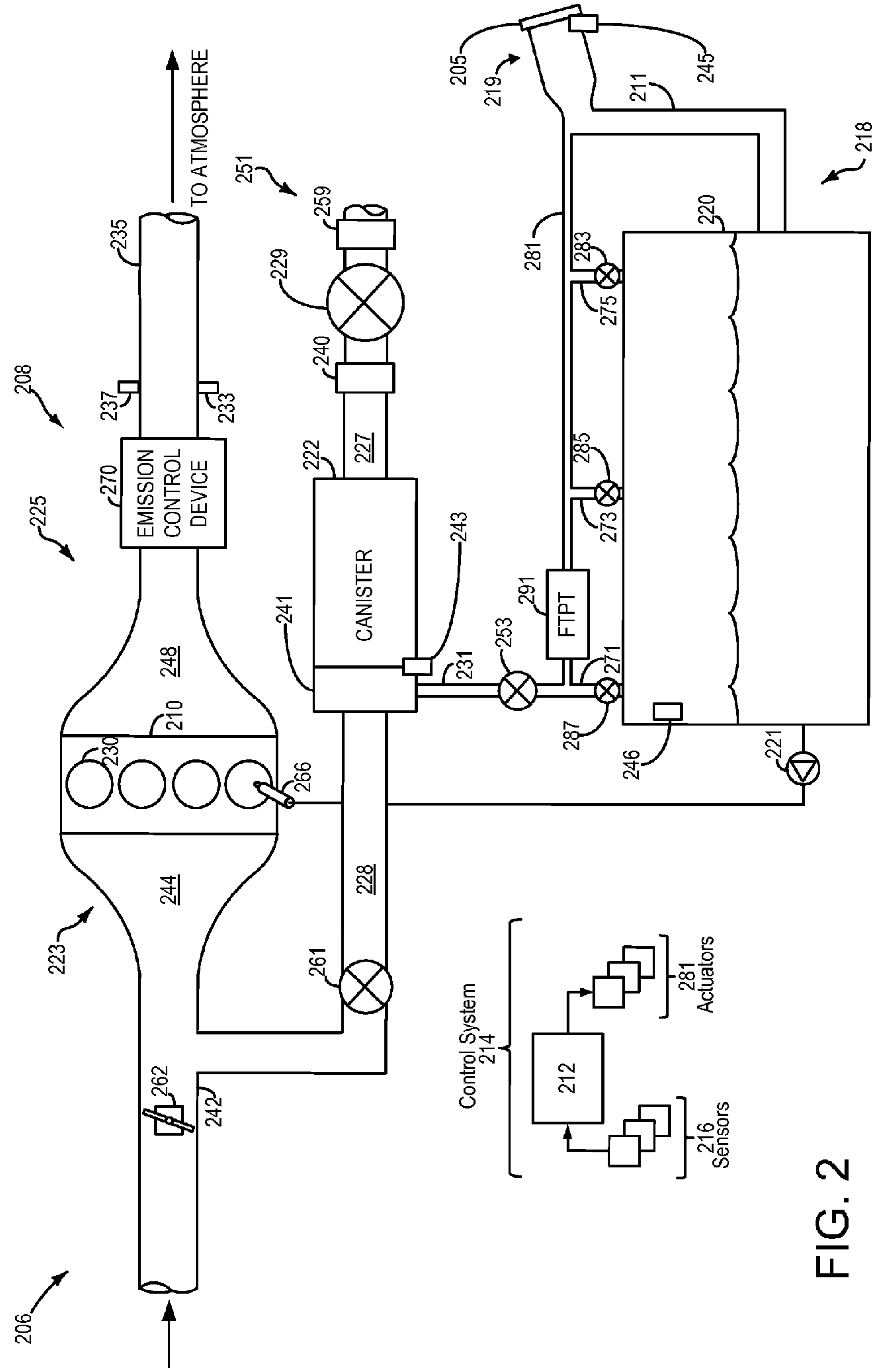
FIG. 2 shows an example vehicle system with a fuel system.

The following description relates to systems and methods for detecting a refueling event for diagnostics in a vehicle system, e.g., the vehicle system shown in FIG. 1. The vehicle includes an engine system with a fuel system, as shown in FIG. 2, where the fuel system is coupled to an evaporative emission control system including a fuel vapor canister. As described below with reference to FIGS. 3 and 4, during a diagnostic routine, e.g., during a leak test performed in the emission control system and/or fuel system, the temperature in the fuel vapor canister may be monitored to determine if a refueling event occurs. As remarked above, a refueling event is a major noise factor that can skew leak detection results as it introduces vapors into the tank. Thus, the diagnostic routine may be discontinued when a refueling event is detected based on a temperature change in the canister. In some examples, such detection may occur in the absence of a fuel tank pressure sensor, or when a fuel tank pressure sensor has degraded. In other example, the detection may also occur in response to both a pressure sensor and detection of a predetermined temperature change in the canister.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid vehicle system as described above with regard to FIG. 1. However, in other examples, vehicle system 206 may not be a hybrid vehicle system and may be propelled via the engine system 208 only.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may include a temperature sensor 246 disposed therein.

Vapors generated in fuel system 218 may be routed to an evaporative emissions control system 251 which includes a fuel vapor canister 222 via vapor recovery line 231, before being purged to the engine intake 223. Fuel vapor canister 222 may include a buffer or load port 241 to which fuel vapor recovery line 231 is coupled. Further, a temperature sensor 243 may be included in fuel vapor canister 222 so that temperature changes in the fuel vapor canister may be monitored to assist in determining if a refueling event occurs during engine off conditions. The temperature sensor 243 may be located in load port 241 of fuel vapor canister 222 or in any other suitable location in canister 222. Fuel vapors undergo an exothermic reaction when carbon in the canister adsorbs vapor from the fuel tank thus the temperature of the fuel vapor canister, e.g., as determined by temperature sensor 243, may increase when vapors dispensed by a refueling pump enter the canister and get adsorbed into activated charcoal in the canister. As described in more detail below, such temperature increases in the fuel vapor canister may be used to assist in diagnostic routines. For example, a refueling event may be identified based on a temperature increase in the fuel vapor canister while leak diagnostics are being performed and the leak diagnostics may be paused or discontinued in response to the identified refueling event.

Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank isolation valves may be included in recovery line 231 or in conduits 271, 273, or 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include an isolation valve 253. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211. Further, a fuel cap locking mechanism 245 may be coupled to fuel cap 205. The fuel cap locking mechanism may be configured to automatically lock the fuel cap in a closed position so that the fuel cap cannot be opened. For example, the fuel cap 205 may remain locked via locking mechanism 245 while pressure or vacuum in the fuel tank is greater than a threshold. In response to an identification of a refueling event, the fuel tank may be depressurized and the fuel cap unlocked after the pressure or vacuum in the fuel tank falls below a threshold.

A fuel tank pressure transducer (FTPT) 291, or fuel tank pressure sensor, may be included between the fuel tank 220 and fuel vapor canister 222, to provide an estimate of a fuel tank pressure. As described below, in some examples, during engine off conditions sensor 291 may be used to monitor changes in pressure and/or vacuum in the fuel system to determine if a leak is present. The fuel tank pressure transducer may alternately be located in vapor recovery line 231, purge line 228, vent line 227, or other location within emission control system 251 without affecting its engine-off leak detection ability. As another example, one or more fuel tank pressure sensors may be located within fuel tank 220.

Emissions control system 251 may include one or more emissions control devices, such as one or more fuel vapor canisters, e.g., fuel vapor canister 222, filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve may be a normally open valve so that one or more fuel tank isolation valves, e.g., valves 87, 285, 283 or 253 may be used to control venting of fuel tank 220 with the atmosphere. For example, in hybrid vehicle applications, a fuel tank isolation valve may be a normally closed valve so that by opening the isolation valve, fuel tank 220 may be vented to the atmosphere and by closing the isolation valve, fuel tank 220 may be sealed from the atmosphere. In some examples, a fuel tank isolation valve may be actuated by a solenoid so that, in response to a current supplied to the solenoid, the valve will open. For example, in hybrid vehicle applications, the fuel tank 220 may be sealed off from the atmosphere in order to contain diurnal vapors inside the tank since the engine run time is not guaranteed. Thus, for example, a fuel tank isolation valve may be a normally closed valve which is opened in response to certain conditions. For example, a fuel tank isolation valve may be commanded open following a detection of a refueling event so that the fuel tank is depressurized for refueling.

Diagnostics may be performed on the evaporative emission control system 251 and/or fuel system 218, e.g., to detect leaks in the system. For example, diagnostics may be performed to test for leaks in the emission control system during engine off conditions, e.g., after a vehicle key off, to mitigate noise factors associated with vehicle dynamics such as road feedback, sharp-turn G forces, fuel sloshing, etc. During leak detection execution, a controller may operate in a low power mode with some sensors in the system depowered, e.g., a fuel level sensor may be turned off during leak detection. In some examples, engine off natural vacuum (EONV) may be used to provide vacuum for leak diagnostics. For example, vacuum increases in the fuel tank due to temperature changes may be monitored to determine if a leak is present in the fuel system. As another example, a pump 240 may be included in the emission control system to generate pressure or vacuum for leak diagnostics while the engine is not in operation. For example, pump 240 may be located in canister vent line 227 and may be actuated to generate an increased vacuum or pressure in the system. The pressure or vacuum changes in the system may be monitored for detecting leaks.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, canister temperature sensor 243, and fuel tank temperature sensor 246. Other sensors such as pressure, temperature, air/fuel ratio, and composition sensors may be coupled to various locations in the vehicle system 206. As another example, the actuators may include fuel injector 266, throttle 262, valves 253, 287, 285, 283, and pump 240. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 3.

Figure 3:
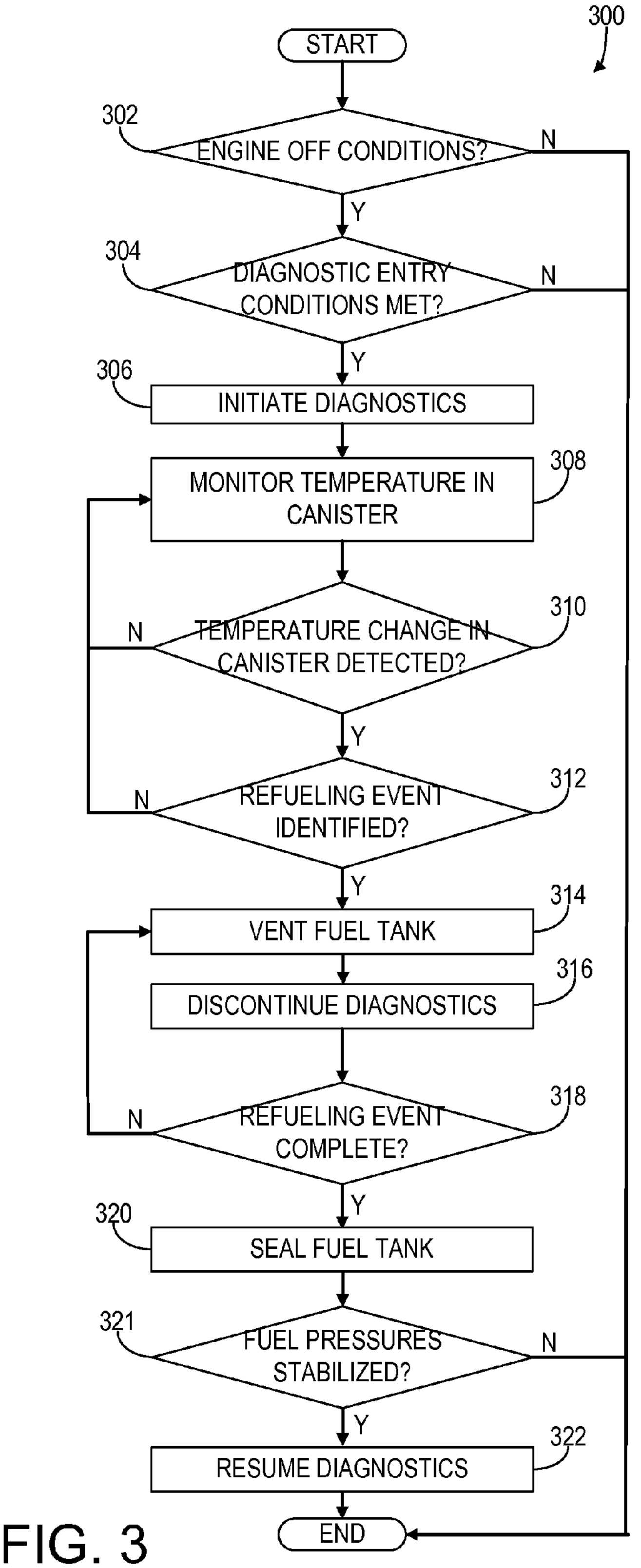
FIG. 3 shows an example method for detecting a refueling event for diagnostics in accordance with the disclosure.

FIG. 3 shows an example method 300 for detecting a refueling event for diagnostics by monitoring temperatures changes in a fuel vapor canister in an emission control system during engine off conditions. As remarked above, leak testing and other diagnostic routines may be performed on engine and vehicle systems during engine off conditions. During such diagnostic routines, an occurrence of a refueling event may cause a significant amount of noise in the diagnostics leading to inaccurate diagnostic results or an inability of the diagnostic routines to collect sufficient data for diagnosis. Since the engine is off during these diagnostic routines, many sensor systems may be disabled so that refueling may not be able to be detected during the diagnostics. For example, a fuel level sensor may be disabled during diagnostics so that a refueling event cannot be inferred from the fuel level sensor. In some examples, a pressure sensor in the fuel system may be used to indicated a refueling event during diagnostics, However, such approaches are prone to false refueling calls during certain conditions, e.g., if the vehicle is being towed, a trunk is opened and slammed shut, someone sits on car and shakes it, etc. During refueling, the vapors dispensed by the refueling pump enter the canister and get adsorbed into the activated charcoal causing an exothermic chemical reaction in the canister which gives off heat. Thus, temperature increases in the canister may be used to detect when a refueling event is occurring so that diagnostic routines may be adjusted accordingly.

At 302, method 300 includes determining if engine off conditions are present. In hybrid vehicle applications, determining if engine off conditions are present may include determining if the vehicle is operating in an electric mode. For example, the vehicle may be a plug-in hybrid electric vehicle which may be operated in an electric mode with the engine-off. Engine off conditions may include any condition when an engine of the vehicle is not in operation. Engine off conditions may follow a key-off event wherein the vehicle is turned off, e.g., where the vehicle is parked or is not in use and the engine is not running. In some examples, an engine off condition may include a vehicle on condition, where the vehicle is moving or travelling while the engine is not in operation. However, in other examples, an engine off condition may occur when the vehicle is not moving or when the vehicle is stationary, e.g., when the vehicle is shut-down for refueling.

If engine off conditions are present at 302, method 300 proceeds to 304. At 304, method 300 includes determining if diagnostic entry conditions are met. Diagnostic entry conditions may include any suitable entry conditions for performing a diagnostic routine in the vehicle. For example, diagnostic entry conditions may include entry conditions for initiating leak diagnostics in the evaporative emission control system and/or fuel system of the vehicle. Examples of diagnostic entry conditions include a temperature in the fuel system greater than a threshold and/or an amount of vacuum or pressure in the fuel system greater than a threshold. For example, leak testing may be performed using engine off natural vacuum wherein vacuum or pressure increases are generated in the fuel tank via naturally occurring diurnal temperature changes. For example, during an increasing ambient temperature, an amount of pressure in the fuel tank may increase so that leak diagnostics in the fuel system are initiated in response to this pressure increase. As another example, during a decreasing ambient temperature, an amount of vacuum in the fuel system may increase so that leak diagnostics in the fuel system are initiated in response to the vacuum increase. As another example, diagnostic entry conditions may be based on a diagnostic schedule. For example, if a threshold time duration has passed since a previous leak test then a leak test may be scheduled to perform at the next available opportunity, e.g., following a key-off event.

If diagnostic entry conditions are met at 304, method 300 proceeds to 306. At 306, method 300 includes initiating diagnostics. For example, leak diagnostics in the emission control system may be initiated and performed. In the example where engine off natural vacuum is used for leak testing, initiating leak diagnostics may include sealing the emission control system from the atmosphere, e.g., closing canister vent valve 229, and putting the fuel tank in communication with the fuel vapor canister so that pressure or vacuum in the fuel tank is provided to components in the sealed emission control system. The pressure or vacuum may then be monitored to test for leaks in the system. As another example, a leak detection pump, if included in the system, may be actuated to generate pressure or vacuum in the emission control system for leak testing. For example, pump 240 may be operated for a duration to generate pressure changes in the system for leak testing while the emission control system is sealed off from the atmosphere, e.g., while the canister vent valve is in a closed position.

At 308, method 300 includes monitoring temperature in the fuel vapor canister. For example, temperature sensor 243 in fuel vapor canister 222 may be used to monitor temperatures in the fuel vapor canister while diagnostics are being performed. As remarked above, temperature increases in the canister may be used to detect when a refueling event occurs since an increased amount of fuel vapor enters the fuel vapor canister while fuel is replenished in the fuel tank. In some examples, monitoring temperature in the fuel vapor canister may further include compensating the measured temperatures in the fuel vapor canister for one or more of an ambient temperature, a fuel type, and an altitude.

At 310, method 300 includes determining if a temperature change in the canister is detected. For example, a predetermined temperature change in a fuel vapor canister may indicate that a refueling event is occurring. The predetermined temperature change may comprise a rate of temperature change in the canister greater than a threshold. For example, if the temperature in the fuel vapor canister rises by a threshold amount during a threshold duration, then this may indicate that fuel vapors are being introduced into the canister from refueling. In particular, the fuel tank may be pressurized and the predetermined temperature change may comprise a temperature increase in the canister greater than a threshold temperature increase. By detecting a rapid and sudden temperature rise in canister, a refueling event may be identified. Further, this temperature change in the canister may be compensated for ambient temperature, fuel type, and altitude of the vehicle. For example, a temperature in the fuel tank may also be monitored, e.g., via temperature sensor 246, and compared with an ambient temperature to determine if the temperature increase in the fuel vapor canister is merely due to ambient temperature changes and not to refueling.

If a temperature change in the canister is not detected at 310, method 300 returns to 308 to continue monitoring temperature in the canister while diagnostics are performed. For example, leak diagnostics may be completed only if a temperature change in the canister is not detected. If a leak is detected during the leak test then degradation of the system may be indicated. For example, in response to a measured pressure or vacuum change in the system less than an expected pressure or vacuum change in the system, a leak may be indicated. Indicating a degradation may include setting a code stored in memory of the controller, for example.

However, if a temperature change is detected at 310, method 300 proceeds to 312. At 312, method 300 includes determining if a refueling event is identified. For example, as remarked above, a refueling event may be indicated or identified in response to a predetermined temperature change in the fuel vapor canister and, in some examples, further responsive to a temperature sensor coupled to the fuel tank, e.g., to account for ambient temperature increases which may cause canister temperature to increase in the absence of a refueling event. In some examples, identification of a refueling event may be further based on a pressure sensor coupled to the fuel tank, e.g., pressure sensor 291. For example, a predetermined pressure change in the fuel tank may also be used to assist in identifying a refueling event, e.g., an increase in pressure in the fuel tank may indicate that fuel is being introduced into the fuel tank via refueling. Thus, in some examples, pressure readings of a pressure sensor in the fuel tank may be used in addition to the predetermined temperature change in the canister to determine if a refueling event is to be indicated. However, in some examples, only the predetermined temperature change in the fuel vapor canister may be used to indicate a refueling event. For example, if a pressure sensor in the fuel tank is degraded or faulty, then the predetermined temperature change in the canister may be used to determine if a refueling event is to be indicated.

If a refueling event is not identified at 312, method 300 returns to 308 to continue monitoring temperature in the canister while diagnostics are performed. However, if a refueling event is identified at 312, method 300 proceeds to 314. At 314, method 300 includes venting the fuel tank in response to identification of the refueling event. For example, canister vent valve 229 may be opened and/or a fuel tank isolation valve may be opened to provide venting of the fuel tank to the atmosphere during refueling. For example, the fuel tank may be vented into the vapor absorbent canister through the isolation valve so that the pressure or vacuum in the fuel tank is decreased for refueling.

At 316, method 300 includes discontinuing diagnostics in response to identification of the refueling event. For example, leak diagnostics may be discontinued and leak detection algorithm execution may be aborted while the refuel event takes place. For example, a leak detection pump operation may be discontinued and various sensors and processing associated with the diagnostic routine may be disabled or paused. Further, a control module carrying out the leak diagnostics may be powered down.

At 318, method 300 includes determining if the refueling event is complete. If the refueling event is not complete at 318, method 300 returns to 314 to continue venting the fuel tank while the diagnostics are discontinued or paused. However, if the refueling event is complete at 318, method 300 proceeds to 320. After a refuel event is finished, the tank is sealed up when the vehicle is a plug-in hybrid electric vehicle (PHEV). Thus, at 320, method 300 may include sealing the fuel tank. For example, a fuel tank isolation valve may be closed and/or the canister vent valve may be closed to discontinue venting the fuel tank to the atmosphere.

After the fuel tank is sealed, the concentration of hydrocarbons between the liquid and vapor dome are trying to equalize and pressure builds up leading to a volatile and unstable phase. Thus, leak detection diagnostics may be terminated from when refueling event is observed until the vehicle soaks for a few hours to allow the fuel partial pressures to stabilize. Thus, at 321 method 300 may include, determining if fuel pressures in the fuel system have stabilized. For example, determining if fuel pressures in the fuel system have stabilized may be based on a time duration following the refueling event greater than a threshold time duration. Further, determining if fuel pressures in the fuel system have stabilized may be based on one or more pressure or temperature sensors in the fuel system providing stable pressure and/or temperature readings. If pressures in the fuel system have not stabilized at 321, method 300 ends. However, if pressures in the fuel system have stabilized at 321, then, in some examples, the diagnostic routine may be resumed or re-initiated. Thus, at 322, method 300 may include resuming diagnostics. For example, leak diagnostics in the emission control system may be continued, resumed, or reinitiated, e.g., pump 240 may again be actuated to provide pressure changes in the system for leak testing and leak detection algorithm execution may be resumed.

Figure 4:
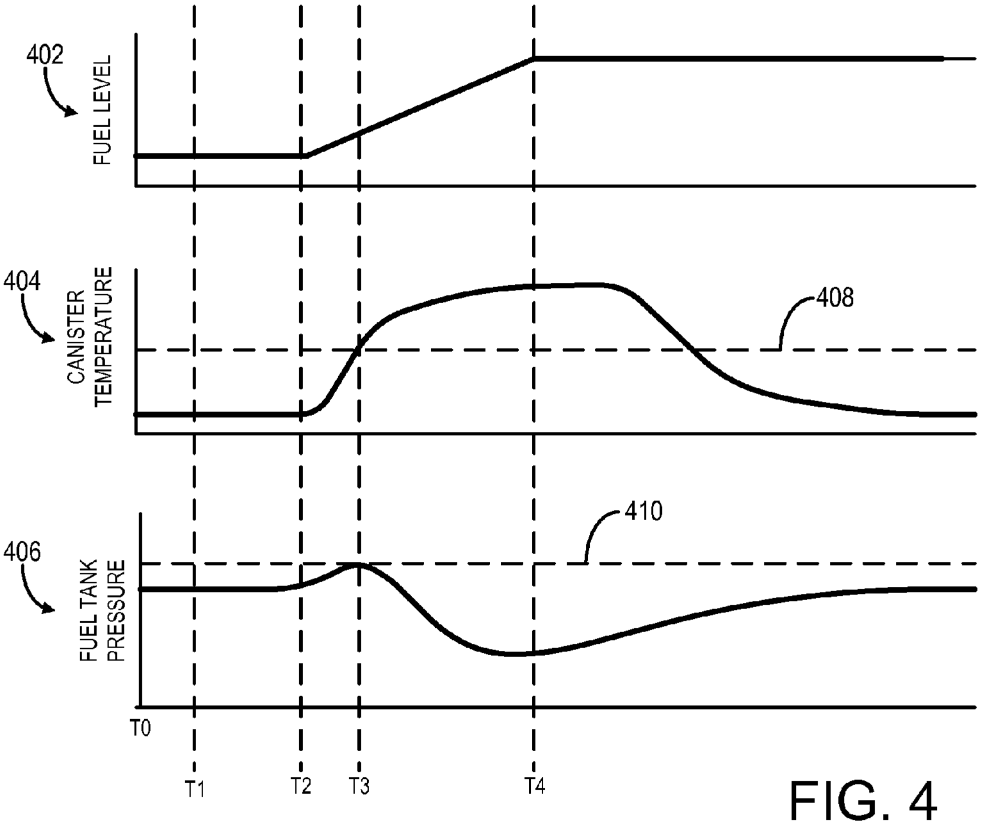
FIG. 4 illustrates an example method for detecting a refueling event for diagnostics in accordance with the disclosure.

FIG. 4 illustrates an example method, e.g., method 300 described above, for detecting a refueling event for diagnostics by monitoring temperatures changes in a fuel vapor canister in an emission control system during engine off conditions. The graph 402 in FIG. 4 shows fuel level in a fuel tank versus time. Graph 404 shows fuel vapor canister temperature, e.g., a measured by temperature sensor 243, versus time. Graph 406 shows fuel tank pressure, e.g., as measured by pressure sensor 291, versus time.

At time T0 in FIG. 4, a key off event occurs. For example, a vehicle operator may perform a key off so that operation of the engine is discontinued. After the key off, the fuel tank may be sealed off from the atmosphere in order to contain diurnal vapors in the tank. For example a canister vent valve may be closed or maintained closed and/or a fuel tank isolation valve may be closed to seal off the fuel tank from the atmosphere.

At time T1, a diagnostic routine, e.g., leak testing in the emission control system, is initiated. Thus, if present, a leak detection pump, e.g., pump 240, may be actuated at time T1 to generate pressure changes in the emission control system for leak testing. At time T2 a refueling event begins to occur so that liquid fuel is introduced into the fuel tank as indicated by the fuel level rise in graph 402. Vapors from the fuel introduced into the fuel tank cause the pressure in the fuel tank to increase, as shown in graph 406. Further, these vapors are introduced into the fuel vapor canister so that temperature in the fuel vapor canister increases as shown in graph 404.

At time T3, a predetermined temperature increase occurs in the canister, e.g., a rate of temperature increases above a threshold or the temperature increases to a threshold amount 408 in a predetermined period of time. This temperature change in the canister may indicate that a refueling event is taking place so that the diagnostic routine may be adjusted accordingly. Further, in some examples, the increased pressure in the fuel tank may also be used to indicate the refueling event. For example, at time T3 the pressure increases to a threshold amount 410 indicating that refueling is being performed. Thus, when the refueling event is identified at time T3, the fuel tank is vented to the atmosphere, e.g., by opening the canister vent valve and the diagnostic routine is discontinued, e.g., leak testing is ceased or paused, while refueling takes place between times T3 and T4. At time T4, the refueling event is completed and the fuel tank is again sealed off from the atmosphere, e.g., by closing the canister vent valve and/or a fuel tank isolation valve so that after time T4 the diagnostic routine may be resumed or re-initiated.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with an engine comprising:
discontinuing leak diagnostics in response to a temperature change in a fuel vapor canister coupled to a fuel tank in an emission control system while the leak diagnostics are being performed in the emission control system.

2. The method of claim 1, wherein the temperature change comprises a rate of temperature change in the canister greater than a threshold.

3. The method of claim 1, wherein the fuel tank is pressurized and the temperature change comprises a temperature increase in the canister greater than a threshold temperature increase.

4. The method of claim 1, further comprising indicating a refueling event in response to the temperature change in the fuel vapor canister and venting the fuel tank in response to the indicated refueling event.

5. The method of claim 1, wherein said step of discontinuing the leak diagnostics is further responsive to a temperature sensor coupled to the fuel tank.

6. The method of claim 1, wherein said step of discontinuing the leak diagnostics is further responsive to a pressure sensor coupled to the fuel tank.

7. The method of claim 6, wherein said step of discontinuing the leak diagnostics is responsive to a fault in said pressure sensor.

8. The method of claim 6, wherein said step of discontinuing the leak diagnostics is responsive to both a fuel tank pressure indication from said pressure sensor and said temperature change in the fuel vapor canister.

9. The method of claim 4, wherein the temperature change is compensated for by one or more of an ambient temperature, a fuel type, and an altitude.

10. The method of claim 9, further comprising discontinuing venting the fuel tank after a refueling is completed and resuming the leak diagnostics.

11. The method of claim 1, wherein the fuel vapor canister contains activated charcoal.

12. A method for a vehicle with an engine comprising:
during engine off conditions:
performing leak diagnostics in a fuel emission control system of the engine; and
in response to a predetermined temperature change in a fuel vapor canister in a vent path of a fuel tank, ceasing the leak diagnostics.

13. The method of claim 12, wherein the predetermined temperature change comprises a rate of temperature increase in the canister greater than a threshold and wherein ceasing further comprises powering down a control module carrying out the leak diagnostics.

14. The method of claim 12, wherein the fuel tank is pressurized and the predetermined temperature change comprises a temperature increase in the canister greater than a threshold temperature increase.

15. The method of claim 12, further comprising indicating a refueling event in response to the predetermined temperature change in the fuel vapor canister and venting the fuel tank in response to the indicated refueling event.

16. The method of claim 12, wherein said step of discontinuing the leak diagnostics is further responsive to a temperature sensor coupled to the fuel tank and an ambient temperature.

17. The method of claim 12, wherein said step of discontinuing the leak diagnostics is further responsive to a pressure sensor coupled to the fuel tank.

18. A method for a vehicle with an engine comprising:

during engine off conditions:

performing leak diagnostics in a fuel emission control system of the engine;

detecting a refueling event based on a predetermined temperature change in a fuel vapor canister in a vent path of a fuel tank; and ceasing the leak diagnostics in response to detecting the refueling event.

19. The method of claim 18, wherein the predetermined temperature change comprises a rate of temperature increase in the canister greater than a threshold.

20. The method of claim 18, wherein the step of detecting a refueling event is further responsive to a temperature sensor coupled to the fuel tank.

* * * * *